US010053955B2

(12) United States Patent
Fischer et al.

(10) Patent No.: US 10,053,955 B2
(45) Date of Patent: Aug. 21, 2018

(54) SYSTEM AND METHOD FOR DISTRIBUTED CONTROL OF MULTIPLE WELLHEADS

(71) Applicant: Q.E.D. Environmental Systems, Inc., Dexter, MI (US)

(72) Inventors: David A. Fischer, Ann Arbor, MI (US); David Mioduszewski, Dexter, MI (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 0 days.

(21) Appl. No.: 15/121,863

(22) PCT Filed: Jul. 14, 2015

(86) PCT No.: PCT/US2015/040316
§ 371 (c)(1),
(2) Date: Aug. 26, 2016

(87) PCT Pub. No.: WO2016/010985
PCT Pub. Date: Jan. 21, 2016

(65) Prior Publication Data
US 2017/0122065 A1 May 4, 2017

Related U.S. Application Data

(60) Provisional application No. 62/024,661, filed on Jul. 15, 2014.

(51) Int. Cl.
*E21B 43/12* (2006.01)
*E21B 34/02* (2006.01)
(Continued)

(52) U.S. Cl.
CPC .............. *E21B 34/02* (2013.01); *B09B 1/006* (2013.01); *E21B 33/03* (2013.01);
(Continued)

(58) Field of Classification Search
CPC .......... B09B 1/006; E21B 43/12; E21B 34/02
See application file for complete search history.

(56) References Cited

U.S. PATENT DOCUMENTS

| 6,169,962 B1 | 1/2001 | Brookshire et al. |
| 2001/0005812 A1* | 6/2001 | Brookshire ............... B09B 1/00 702/6 |

(Continued)

FOREIGN PATENT DOCUMENTS

| CN | 1682009 A | 10/2005 |
| CN | 203145904 U | 8/2013 |
| WO | 2004034196 A2 | 4/2004 |

OTHER PUBLICATIONS

International Search Report and Written Opinion of the ISA, ISA/KR, Daejeon, dated Sep. 10, 2015.
(Continued)

*Primary Examiner* — Kipp C Wallace
(74) *Attorney, Agent, or Firm* — Harness, Dickey & Pierce, P.L.C.

(57) ABSTRACT

The present disclosure relates to a system for controlling an extraction of landfill gas flow (LFG) from a plurality of wellheads at a landfill. The system has a first wellhead located at the landfill, a first processor having a first rule set, and a first LFG flow control valve controllable by the first processor. A second wellhead is located at the landfill in a vicinity of the first wellhead and has a second processor and a second LFG flow control valve. The second processor has a second rule set and is operable to control the second LFG flow control valve. The first and second processors use their said rule sets to control the first and second LFG flow control valves, respectively, to control an LFG flow through their said first and second wellheads, respectively.

9 Claims, 6 Drawing Sheets

(51) Int. Cl.
    *B09B 1/00*           (2006.01)
    *E21B 41/00*        (2006.01)
    *E21B 33/03*        (2006.01)
    *E21B 47/00*        (2012.01)

(52) U.S. Cl.
    CPC .......... *E21B 41/0092* (2013.01); *E21B 43/12* (2013.01); *E21B 47/00* (2013.01)

(56) References Cited

U.S. PATENT DOCUMENTS

| | | |
|---|---|---|
| 2005/0163571 A1 | 7/2005 | Kittle |
| 2006/0064256 A1* | 3/2006 | Appleford ............... E21B 43/12 702/31 |
| 2007/0225923 A1 | 9/2007 | Tooley |
| 2008/0044889 A1 | 2/2008 | Augenstein |
| 2012/0011104 A1 | 1/2012 | Tooley |
| 2014/0094974 A1* | 4/2014 | Rashid ................. G05D 7/0682 700/282 |
| 2014/0182846 A1 | 7/2014 | Fischer et al. |
| 2017/0216891 A1* | 8/2017 | Campanella .......... E21B 43/122 166/250.15 |

OTHER PUBLICATIONS

Supplementary European Search Report for corresponding European Patent Application No. 15822445.1 dated Feb. 6, 2018, 4 pages.
First Office Action and Search Report mailed in corresponding Chinese Patent Application No. 2015800196005 dated Jun. 1, 2018, 25 pp.

* cited by examiner

SYSTEM AND METHOD FOR DISTRIBUTED CONTROL OF MULTIPLE WELLHEADS

CROSS-REFERENCE TO RELATED APPLICATIONS

This application is a 371 U.S. National Phase of International Application PCT/US2015/040316, filed on Jul. 14, 2015, which claims the benefit of U.S. Provisional Application No. 62/024,661, filed on Jul. 15, 2014. The entire disclosures of the above applications are incorporated herein by reference.

FIELD

The present disclosure relates to wellheads typically used at landfills for the recovery of gasses and fluids, and more particularly to a distributed wellhead system and method by which a performance of each of a plurality of independent wellheads can be monitored and adjustments coordinated to take into account the influence that a change to one specific wellhead may cause to one or more other wellheads within a given area, with a goal of coordinating control over the adjustments made to all of the wellheads to optimize a collective performance of the wellheads.

BACKGROUND

The statements in this section merely provide background information related to the present disclosure and may not constitute prior art.

A landfill gas ("LFG") system may consist of many LFG wells connected to a central gas extraction vacuum blower by means of a piping header system. The LFG wells are often used at landfills to extract methane gas that develops below the surface of the landfill from decomposing waste. The vacuum assists in maintaining a desired flow rate of the methane gas out through the wellhead.

The header system has branches and end points that connect the vacuum blower to all of the LFG wells located across a landfill. Currently each LFG wellhead has a single manually adjustable valve that controls gas flow (i.e., the amount of vacuum applied to the well). Each well has the ability to produce some volume of LFG per unit time. The production of LFG will typically vary at least slightly from well to well, and this well-to-well variance may change over time as well.

In actual LFG systems the central vacuum source is never able to apply full vacuum to all wellheads equally. This is typically due to blower sizing and head loss in the piping system. Variations in wellhead valve settings will often affect vacuum availability to other wellheads "downstream" from a given wellhead. In other words, a significant change in a valve setting on wellhead A is expected to change the pipe header conditions for wells in the vicinity of wellhead A. Additionally, changes in overall site conditions (macro changes), most notably barometric pressure, can change overall vacuum blower flow rate and rates of apparent gas production from large numbers of wellheads. Wellhead conditions can also change over time, impacting the production of LFG (e.g., water build-up can restrict LFG flow into the well, etc.). The macro changes lead to the necessity of ongoing optimization and adjustment of the manual LFG valves to achieve various control goals (maximize LFG recovery, control LFG emissions, keep oxygen intrusion low, etc.). Such on-going optimization efforts often necessitate frequent trips to each wellhead at a given landfill by a technician in order to check the LFG flow from each wellhead and make the needed adjustments in an attempt to optimize the LFG flow. As will be appreciated, this manpower requirement can sometimes be costly and time consuming, especially at landfills where dozens or more wellheads are in use.

But perhaps the most significant drawback to present day LFG systems is the inability to factor in the change that an adjustment to the flow valve of one LFG wellhead will make on the LFG flows produced by other LFG wellheads in the vicinity. This variable is typically not considered by technicians when making a flow valve adjustment to each wellhead. Moreover, intelligent information on the real time flow rates from other wellheads is often not readily available to the technician. So situations may exist where a minor adjustment is made by the technician to one specific wellhead (e.g., wellhead "A") in order to optimize the LFG flow from that well, but this adjustment actually causes a degradation in the flow from one or more other wellheads B and C in the vicinity (e.g., within a 500 ft radius). And then when the technician goes to wellhead B and makes an adjustment to its flow valve, such a change further ends up affecting the LFG flow from wellheads A and C. Thus, it becomes exceedingly difficult, if not impossible, to determine flow valve settings for each of wellheads which optimizes the overall LFG production from all the wells collectively.

SUMMARY

This section provides a general summary of the disclosure, and is not a comprehensive disclosure of its full scope or all of its features.

A system for controlling an extraction of landfill gas flow (LFG) from a plurality of wellheads at a landfill. The system may comprise a first wellhead located at the landfill and having a first processor having a first rule set, and a first LFG flow control valve controllable by the first processor. A second wellhead may be located at the landfill in a vicinity of the first wellhead and may have a second processor and a second LFG flow control valve. The second processor may have a second rule set and be operable to control the second LFG flow control valve. The first and second processors are operable to use their said rule sets to control the first and second LFG flow control valves, respectively, to control an LFG flow through their said first and second wellheads, respectively.

In another aspect the present disclosure relates to a system for controlling extraction of landfill gas flow (LFG) from a plurality of wellheads at a landfill. The system may comprise a first wellhead located at the landfill and having a first processor, a first rule set and a first communications module. The system may also comprise a second wellhead located at the landfill in a vicinity of the first wellhead, and having a second communications module. The first and second processors may be configured to communicate with one another via the first and second communications modules. The first processor of the first wellhead may be configured to determine a proposed control parameter setting for controlling a first predetermined operating parameter associated with the first wellhead, and to obtain real time information from the second wellhead concerning a second predetermined operating parameter associated with the second wellhead. The first wellhead may use the first processor and the first rule set to analyze the real time information obtained from the second wellhead concerning the second predetermined operating parameter, and when necessary to adjust the proposed control parameter to optimize performance of both the first and second wellheads.

In still another aspect the present disclosure relates to a method for controlling an extraction of landfill gas flow (LFG) from a plurality of wellheads at a landfill. The method may comprise using a first wellhead located at the landfill and having a first processor and a first communications module. The method may also comprise using a second wellhead located at the landfill in a vicinity of the first wellhead and having a second processor and a second communications module. The second communications module may be used to share second operating information pertaining to an extraction of LFG gas from the second wellhead with the processor of the first wellhead. The first communications module may be used to share first operating information concerning an extraction of LFG gas from the first wellhead with the processor of the second wellhead. The processors of the first and second wellheads may be used to control an extraction of LFG gas from each, in a manner that optimizes an extraction of LFG gas from both of the first and second wellheads.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
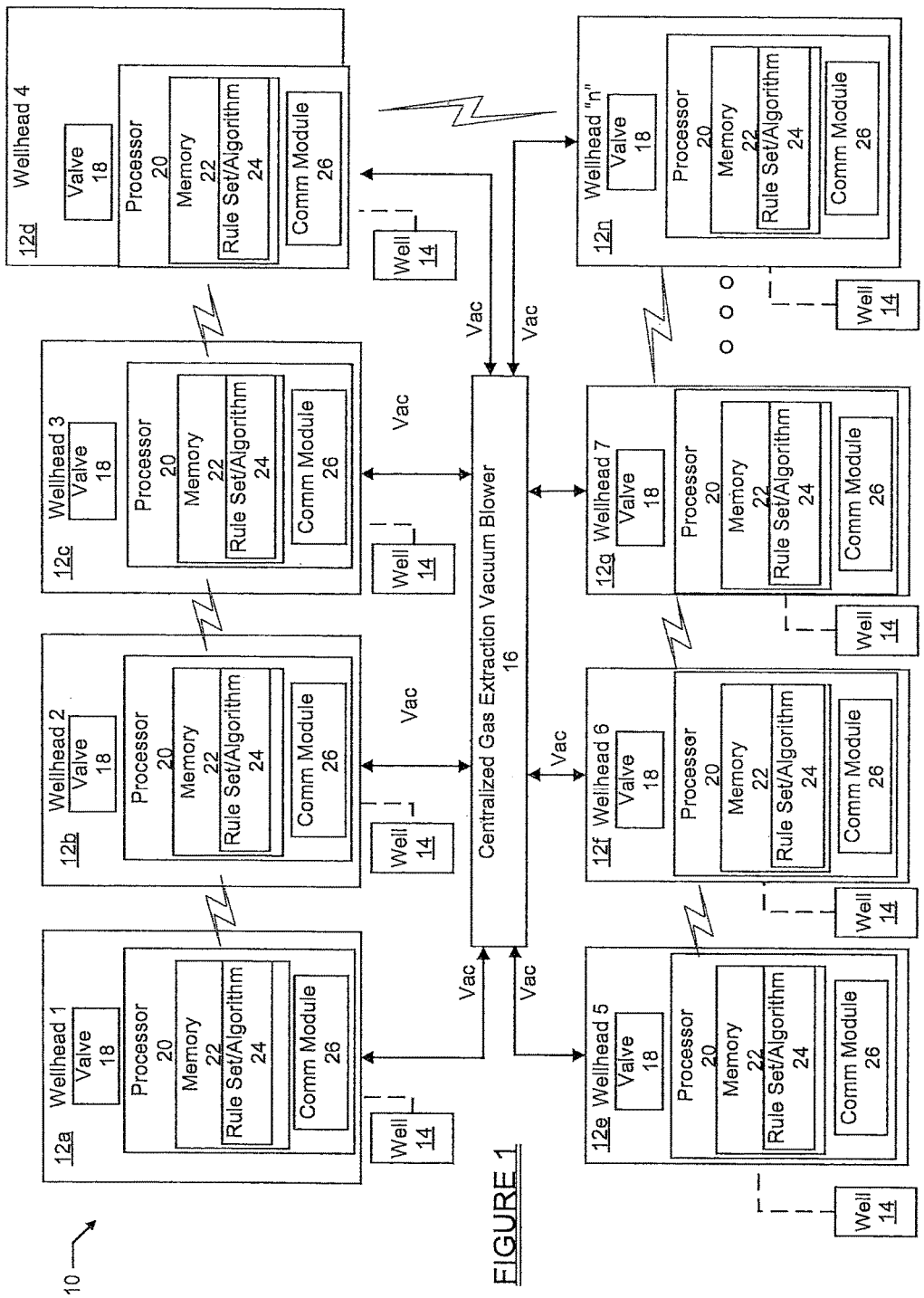
FIG. 1 is a high level block diagram of one embodiment of a distributed wellhead control system in accordance with the present disclosure, wherein each wellhead may communicate with one or more adjacent wellheads via wireless links to reach a consensus on a proposed flow modification to its associated valve before making any flow adjustments, with an effort toward optimizing the LFG flow from all of the wellheads.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a distributed wellhead control system 10 in accordance with one embodiment of the present disclosure. In this example the system 10 includes a plurality of wellheads 12a-12n that may be located at, for example (and without limitation), a landfill. This number may of course vary considerably, and the present disclosure is not limited to use with any specific number of wellheads 12. However, most landfill applications may be expected to employ typically 50-150 such wellheads 12a-12n. The wellheads 12a-12n are associated with wells 14. The wellheads 12a-12n each are in flow communication with a centralized gas extraction vacuum blower 16 which generates a vacuum that is used by each of the wellheads 12a-12n to assist in drawing out landfill gas (LFG) from each well 14.

Each wellhead 12a-12n may include a flow control valve 18 for regulating the vacuum applied by its associated wellhead. A processor 20 may have memory 22, or the memory 22 may be independent of the processor. The memory 22 may be used to store a rule set 24. The rule set 24 may include one or more algorithms that may be run by the processor 20 which enable the associated wellhead 12a-12n to automatically determine a setting for its flow control valve. A wireless, short range communications module 26 (i.e., transceiver), for example a BLUETOOTH® wireless protocol communications module or a ZIGBEE® wireless protocol communications module, may be included to provide bidirectional communications capability to each wellhead 12a-12n. In a typical application the communications module 26 may have a range, for example, of 500 feet, and therefore may enable communications with all other wellheads which are within a 500 foot radius. Obviously the range may vary based on several considerations such as the power of the transmitter section of the communications module 26, any line of sight obstructions, topography, the wireless protocol used, etc. However, most typically, a communications radius of 300-500 feet is readily achievable.

The system 10 provides the significant advantage of enabling each of the wellheads 12a-12n to query one or more of its adjacent wellheads to determine, essentially in real time, various control parameters such as the amount of vacuum being drawn by other nearby wellheads, flow control valve settings being used by other nearby wellheads, etc., which would be important and helpful for a given one of the wellheads 12a-12n to know before making any adjustment to its own flow control valve 18. This is because an adjustment made to the flow control valve 18 of one of the wellheads, for example wellhead 12a, may affect the flow of LFG being withdrawn by its adjacent wellheads, for example wellheads 12b and 12c. Without knowing the real time flow rates of wellheads 12b and 12c and the flow control valve settings being used by those wellheads, the effect on the flow of LFG out from wellheads 12b and 12c cannot be taken into consideration when adjusting the flow control valve 18 of wellhead 12a. But the present system 10 enables this important information to be obtained by the processor 20 using its communications module 26 and interrogating its nearby wellheads, which is done essentially in real time. Using the rule set 24, the processor 20 is able to more accurately determine the degree of adjustment that should be made to its flow control valve 18 in a manner that will eliminate or minimize adverse effects on the flows of LFG being produced through its nearby wellheads, which in this example would be wellheads 12b and 12c. Likewise, the processors 20 associated with wellheads 12b and 12c will perform the same analysis before making any adjustments to their associated flow control valves 18. In this manner the overall production of LFG from all the wellheads 12a-12n is optimized.

Figure 2:
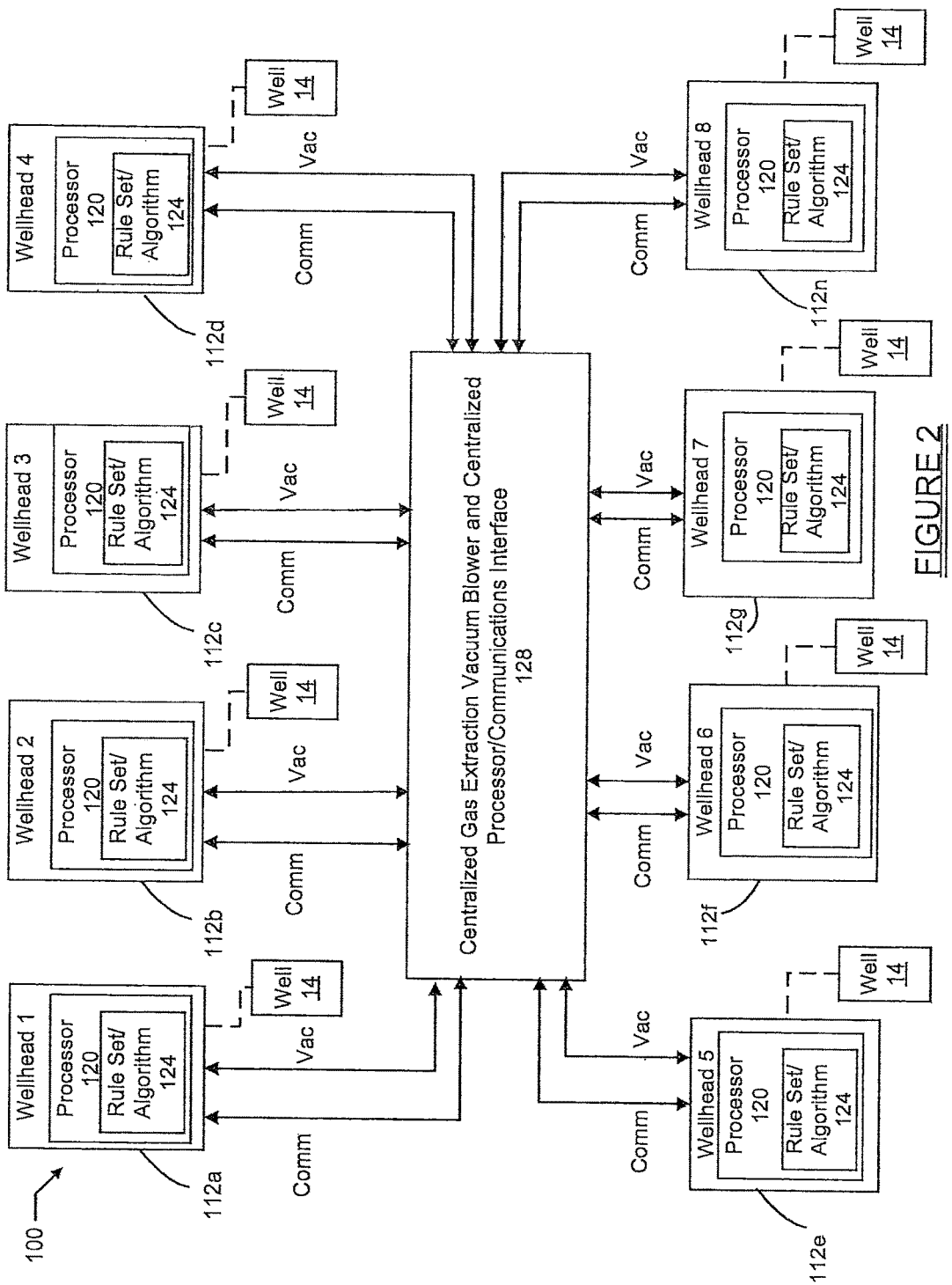
FIG. 2 is another embodiment of the present disclosure in which each wellhead at a worksite (e.g., landfill) is configured to make its own automatic flow adjustment determination, but may also make use of a centralized processor in making flow control adjustments.

FIG. 2 shows a system 100 in accordance with another embodiment of the present disclosure which is somewhat similar to the system 10, but which also incorporates a centralized processor/communications interface 128. Components in common with those referenced in connection with the system 10 are identified by reference numbers increased by 100 over those used in FIG. 1. The system 100 may use its centralized processor/communications interface 128 to perform some or all of the computations that would otherwise be performed by the rule set 124 to assist each wellhead 112a-112n in determining needed adjustments to its respective flow control valve. The use of the centralized processor/communications interface 128 may help to enable integration with other external "macro" data, site-wide historical data for maps, communications to other external applications and/or responsible parties (alarms, etc.); easier "on-the-fly" modification of control schemes, and other data sources in general.

Figure 3:
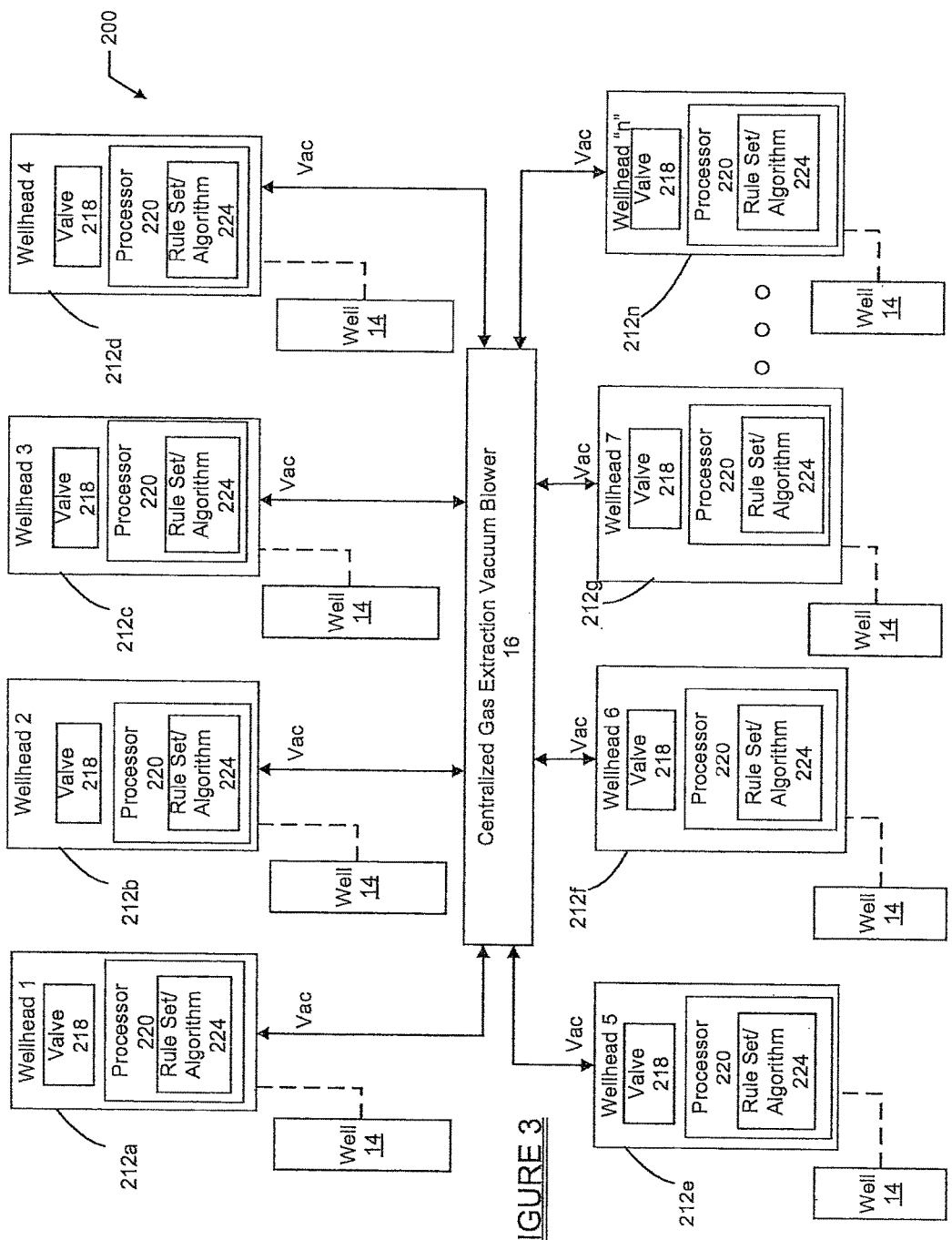
FIG. 3 is another embodiment of the present disclosure in which each of the wellheads make flow control decisions on their own without input from other adjacent wellheads.

FIG. 3 illustrates a system 200 in accordance with another embodiment of the present disclosure. Components in common with those described in connection with the system 10 are denoted with reference numbers increased by 200 over those used in FIG. 1. With the system 200, the wellheads 212a-212n do not communicate with adjacent wellheads, but nevertheless each is provided with the ability to use its own stored rule set/algorithm 224 to make automatic flow adjustments to its respective flow control 18 valve without any involvement from a technician. Thus, this embodiment provides for standalone installation and operation. It can also be used with only some wells at the site, and is likely to be less expensive overall to implement than the embodiments of FIG. 1 or 2.

Figure 4:
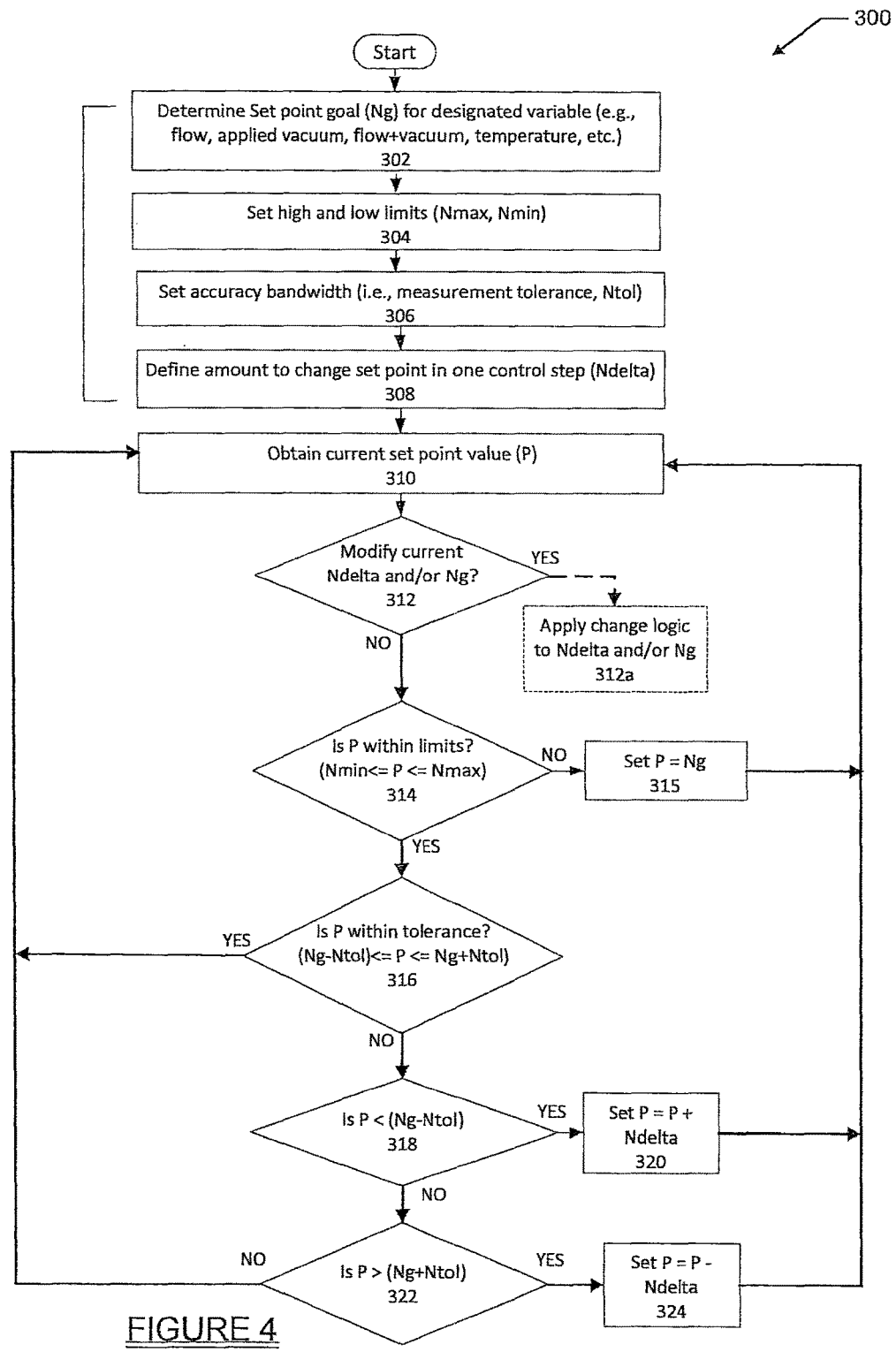
FIG. 4 is a flowchart illustrating various operations that may be performed by the embodiment of FIG. 3.

Turning now to FIG. 4 a flowchart 300 illustrates one example of operations that may be implemented using the rule set 224 to control a single wellhead 212 without taking into account the influence on measured readings being caused by adjacent wellheads 212. Thus, the flowchart 300 corresponds to the operation of the system 200 shown in FIG. 3. At operation 302 a set point goal (Ng) is designated for a selected variable. The variable may be any particular variable that one wishes to monitor and control, for example LFG flow, applied vacuum, flow+vacuum, temperature, etc. For this example it will be assumed that LFG flow is the variable that is being controlled. At operation 304 the high and low limits for the LFG flow are set (Nmin and Nmax). At operation 306 the accuracy bandwidth (i.e., measurement tolerance) Ntol is set. At operation 308 the amount of change (Ndelta) to the measured set point (P) to be implemented in a single control step is defined. Operations 302-308 thus represent operations for configuring the parameters which will be helpful and/or required to control each wellhead 212a-212n.

At operation 310 a monitoring/control sequence of operation begins by obtaining a currently measured set point value (P) for the LFG flow. At operation 312 an initial check may be made to determine if the current Ndelta should be kept or modified. Modification may be made at operation 312a by using any suitable logic. For example, if a certain number of passes have already been made attempting to adjust the set point goal (Ngoal) to a new value, it may be more desirable to alter the Ndelta value to provide a greater magnitude of change, per pass, than what was initially set for Ndelta. This may enable the system 10 to respond even more quickly and efficiently to reach and maintain a new determined value for Ngoal when significant adjustments to the set point (P) are required.

At operation 314 a check is made to obtain the current set point value (P). In this example the current set point value relates to a real time rate of LFG flow which was obtained by measurement. If the current set point (P) value is not within the predetermined minimum and maximum limits, then the set point is set equal to the set point goal (Ng at operation 315). This ensures that the set point P will always be set virtually immediately back to the set point goal (Ng) in the event it is detected to be outside of some predetermined range.

At operation 314, if P is detected to be within the predetermined minimum and maximum limits, then a check is made at operation 316 if P is within the preset error tolerance range $((Ng-Ntol) \leq P \leq (Ng+Ntol))$. If the current set point value (P) is within the predefined error tolerance range, then a loop is made back to operation 310. If the check at operation 316 indicates that the current set point value is outside of the predefined error tolerance range, then a check is made to see if P is less than the difference of Ng−Ntol at operation 318. If the check at operation 318 produces a "Yes" answer, then the current set point (P) is reset such that P=P+Ndelta at operation 320. This produces a new value of the current set point (P) which is within the predefined error tolerance range.

If the check at operation 318 produces a "No" answer, then a check is made at operation 322 to determine if P is above the maximum allowable point defined by Ng+Ntol. If it is, then at operation 324 the current value for the set point is reset to reduce it by the value of Ndelta (P=P−Ndelta). A loop is then made back to operation 310. The method of flowchart 300 thus maintains the current set point (P) within a predefined tolerance range, as well as adjusts the current set point (P) in the event it is detected to be just outside (i.e., either above or below) the predefined error tolerance (Ntol) value.

Figure 5:
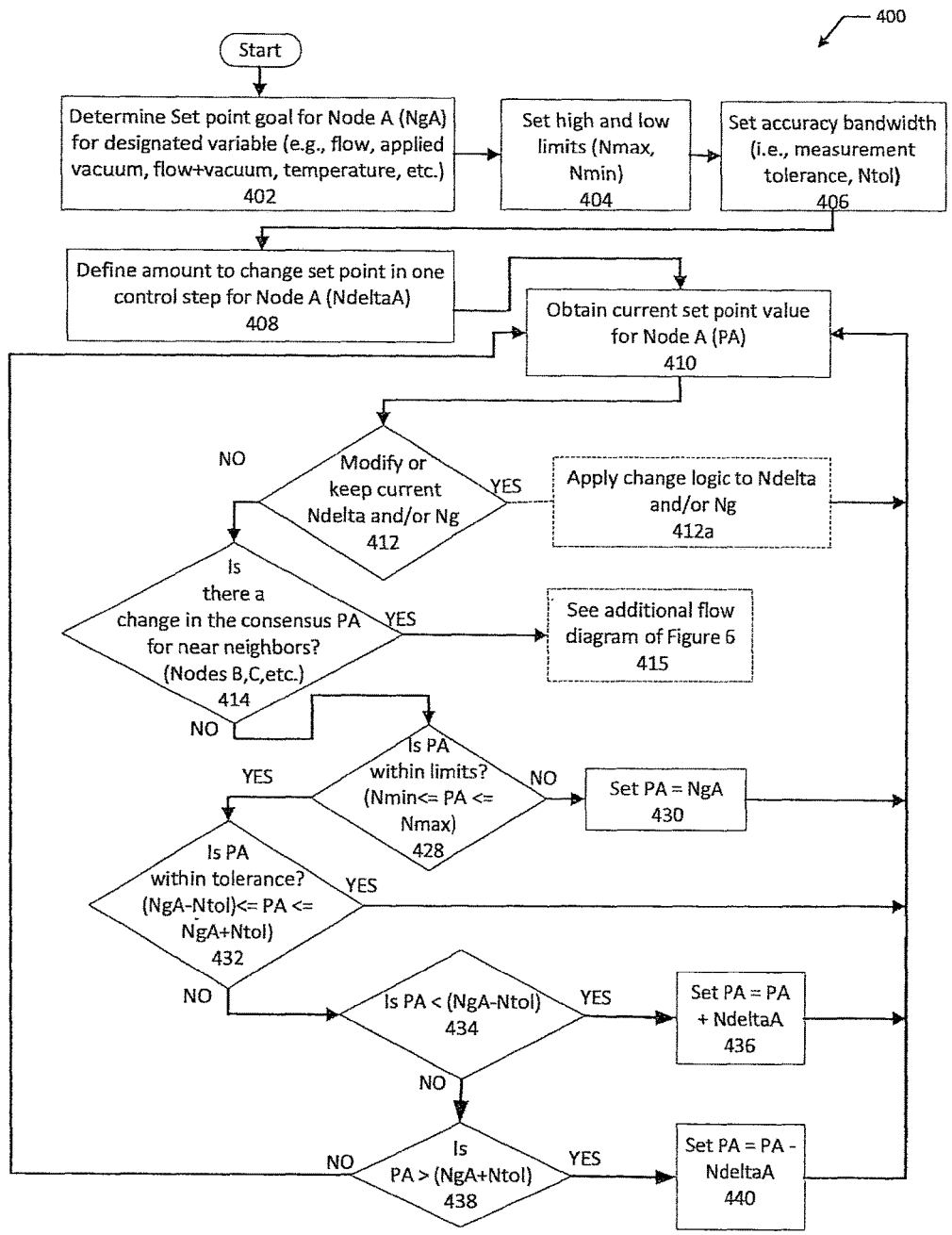
FIG. 5 is a flowchart illustrating various operations that may be performed by the embodiment of FIG. 1.

Referring now to FIG. 5, a flowchart 400 is shown in accordance with a method of controlling each of the wellheads 12a-12n shown in FIG. 1. The method shown in FIG. 5 is able to obtain and use information from a plurality of wellheads 12 when making determinations as to what adjustments are needed to the flow control valve 18 of a given one of the wellheads. For this example it will be assumed that wellhead 12a is the specific wellhead which is being examined and adjusted. Other ones of the wellheads will be referred to simply as "nodes" (e.g., wellhead 12b is "Node B", the set point goal for node B is (Ng(B)), etc.).

Operations 402-408 are identical to operations 302-308 discussed in connection with FIG. 4. At operation 410 the current set point value (P) is obtained. At operation 412 a determination is made as to whether to keep the current value of Ndelta and/or Ngoal, in the same manner as described for operation 312. If such a change is needed it may be implemented via operation 412a.

Figure 6:
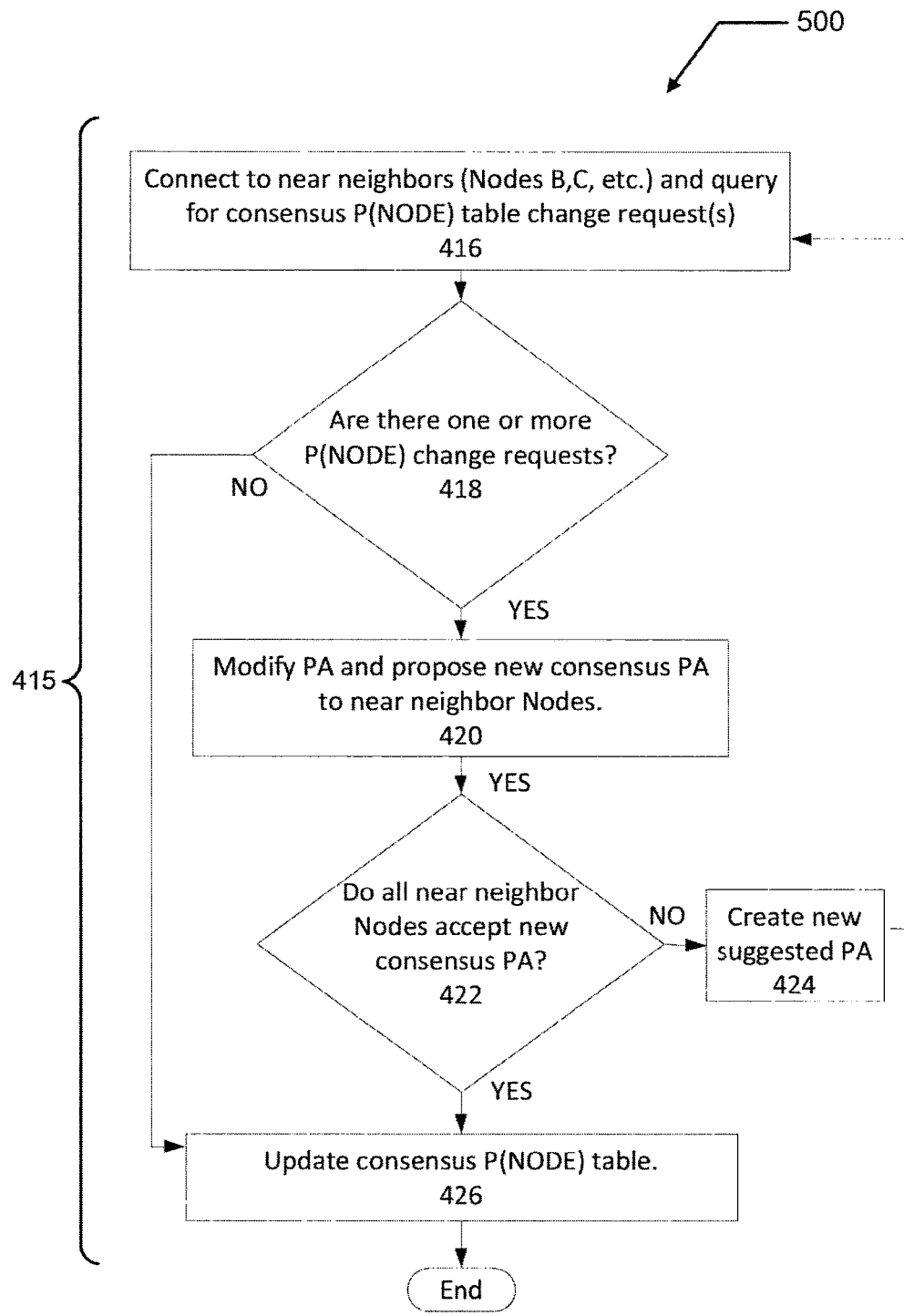
FIG. 6 is a flowchart illustrating specific sub-operations that may be performed when executing operation 412 of FIG. 5.

If the inquiry at operation 412 produces a "No" answer, then at operation 414 a check is made if there is a change in a consensus P(A), that is, a change in the consensus of the current set point for Wellhead 12a for near neighbors (e.g., Nodes B and C). If the answer to this operation is "Yes", then operations sequence 415 is performed. With brief reference to FIG. 6, operations sequence 415 involves initially connecting to the near neighbors (e.g., wellheads 12b and 12c, or Nodes B and C) and making a query for a consensus P(Node) table change request(s), as noted at operation 416. By this operation wellhead 12a (i.e., Node A) is requesting from wellheads 12a and 12b any change request(s) that have been submitted by wellheads 12b and 12c (Nodes B and C) since wellhead 12a made its last set point (P) adjustment. At operation 418 a determination is made if in fact there was at least one P(Node) change request (i.e., a request from either wellhead 12b or 12c). If so, then at operation 420 the processor 20 of wellhead 12a determines a modification to the set point (P(A)) and proposes a new consensus P(A) to the processors 20 of wellheads 12b and 12c. At operation 422 the processor 20 of wellhead 12a determines if the processors of wellheads 12ba and 12c have accepted the proposed new consensus set point (P(A)) and have transmitted notification of their acceptances back to the processor 20 of wellhead 12a. If one or more of the wellheads 12b and 12c have not accepted the proposed new consensus set point (P(A)), then at operation 424 processor 20 of wellhead 12a may create a new consensus set point (P(A)), and operations 416-422 are repeated. Operations 416-422 are repeated until a "Yes" answer is received by processor 20 of wellhead 12a from the processors of wellheads 12b and 12c agreeing to the newly proposed consensus set point (P(A)). At operation 426, then a consensus (P(Node)) table for each of the wellheads 12a, 12b and 12c is updated with the value of the new set point (P).

Generally a proposed set-point may be rejected if it is too extreme and known to impact the near well's set-point. Such information may be known through historical near well change vs. local change database tables. So the methodology described in FIG. 5 may start with a more extreme proposed set point change proposal and then back it down until a point is reached where a specific, proposed new set point is accepted by the processors 20 of the adjacent wellheads 12b and 12c. The rule set 24 can also keep track of acceptance versus rejection from each nearby wellhead 12b and 12c, and also modify a proposed starting point based on these historical statistics.

Returning now to FIG. 5, if the inquiry at operation 414 indicates that there is no change in the consensus set point value that is presently being used by wellhead 12a (P(A)), then at operation 428 a check is made by processor 20 of wellhead 12a to see if the set point P(A) for wellhead 12a is within the predefined minimum and maximum limits. If it is not, then at operation 430 P(A) is set equal to the set point goal (Ng(A)), and a loop is made back to re-perform operation 410.

If the check at operation 428 indicates that P(A) is within the predefined upper and lower limits, then at operation 432 a check is made by the processor 20 of wellhead 12a to determine if P(A) is within the predefined error tolerances. If it is, then a loop is made back to re-perform operation 410.

If the check at operation 432 indicates that P(A) for wellhead 12a is not within the predefined error tolerances, then a check is made by the processor 20 of wellhead 12a at operation 434 to determine if P(A) is less than the difference between Ng(A)−Ntol. If it is, then at operation 436 the current set point P(A) for wellhead 12a is set equal to P(A)+Ndelta(A) by the processor 20, and a loop is made back to re-perform operation 410.

If the check at operation 434 produces a "No" answer, then at operation 438 a check is made by processor 20 of wellhead 12a to determine if P(A) for wellhead A is above the predefined tolerance limit (i.e., P(A)≥(Ng(A)+Ntol)). If it is, then at operation 440 the processor 20 of wellhead 12a sets P(A) equal to P(A)−Ndelta(A), and a loop is made back to re-perform operation 410.

The present system and method thus enables communications between a plurality of wellheads at a worksite so that proposed changes to the flow valve settings at each wellhead can be communicated to other nearby wellheads and a consensus reached as to precisely what degree of change should be made to optimize the LFG flow from all the wellheads. The system and method may substantially reduce, or eliminate, the situations where a change is made to one wellhead, which is believed to optimize its LFG flow performance, but because the effect of this change on other nearby wells is not known or checked, the change degrades the LFG flow performance from one or more nearby wells. Since the monitoring and LFG flow changes implemented to each of the wellheads is made automatically, the need for a technician to physically travel out to each wellhead to check the LFG flow performance and make adjustments thereto, is eliminated or at least substantially reduced.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for controlling an extraction of landfill gas flow (LFG) from a plurality of wellheads at a landfill, the system comprising:

a first wellhead located at the landfill and having a first processor having a first rule set, and a first LFG flow control valve controllable by the first processor;

a second wellhead located at the landfill in a vicinity of the first wellhead and having a second processor and a second LFG flow control valve, the second processor having a second rule set and being operable to control the second LFG flow control valve;

a third wellhead located at the landfill in a vicinity of the first and second wellheads and having a third processor and a third LFG flow control valve, the third processor having a third rule set and being operable to control the third LFG flow control valve;

and the first, second and third processors operable to use their said rule sets to control the first, second and third LFG flow control valves, respectively, to control an LFG flow through their said first, second and third wellheads, respectively;

a first communications module associated with the first wellhead;

a second communications module associated with the second wellhead;

a third communications module associated with the third wellhead;

the second communications module being configured to share second operating information pertaining to an extraction of LFG from the second wellhead with the processors of the first and third wellheads, and the first communications module being configured to share first operating information concerning an extraction of LFG from the first wellhead with the processors of the second and third wellheads; and the first and second processors each using both the first information and the second information to control settings for their respective LFG flow control valves in a manner which optimizes an extraction of LFG from each of the first and second wellheads; and wherein:

the first processor is configured to, prior to making a change to a setpoint for LFG flow point:
communicate to both of the second and third processors to request information on any previously made requests by the second and third processors to change LFG setpoints of their respective second and third flow control valves; and using information supplied by any one or more of the second and third processors regarding previously requested LFG setpoint changes made by the second and third processors;

to use the information from the second and third processors to determine a new proposed LFG setpoint for use with the first wellhead, and to transmit the new proposed LFG setpoint to both of the second and third processors as a new consensus LFG setpoint; and when information is received from both the second and third processors that both have approved the new consensus LFG setpoint, implementing the new consensus LFG setpoint, and when at least one of the second and third processors has disapproved the new consensus LFG setpoint, then using the first processor to re-propose a modified, new consensus LFG setpoint to the second and third processors.

2. The system of claim 1, further comprising a centralized gas extraction blower for providing a vacuum to each of the first and second wellheads.

3. The system of claim 2, wherein the centralized gas extraction blower includes a processor in communication with at least one of the first, second and third processors for providing additional information to at least one of the first, second and third processors for assisting the first, second and third processors in controlling an extraction of LFG from said first, second and third wellheads.

4. The system of claim 1, wherein the first, second and third communications modules communicate wirelessly with one another.

5. A system for controlling an extraction of landfill gas flow (LFG) from a plurality of wellheads at a landfill, the system comprising:

a first wellhead located at the landfill and having a first processor and a first rule set;

a second wellhead located at the landfill in a vicinity of the first wellhead, and having a second processor and a second rule set;

a centralized gas extraction vacuum blower and centralized processor, configured to receive first real time operating parameter information from the first wellhead and second real time operating parameter information from the second wellhead, and to communicate supplemental information related to the first and second real time operating parameter information to each of the first and second wellheads; and wherein the first and second processors are further configured to use the supplemental information, along with the first and second rule sets and the first and second real time operating parameter information, to set first and second control parameters to control the extraction of LFG at the first and second wellheads;

wherein the first and second processors each use both of the first and second real time operating parameter information, as well as the supplemental information, to set the first and second control parameters to optimize the extraction of LFG from both of the first and second wellheads; and wherein whenever a given one of the first and second processors determines a change to an LFG setpoint for its associated said wellhead is needed, then the given one of the first and second processors proposes a new LFG setpoint to each other and waits to receive an approval from the other before implementing the new LFG setpoint, and if the new LFG setpoint is not approved by the other, then the given one of the first and second processors proposes a new, modified LFG setpoint for approval by the other.

6. The system of claim 5, wherein:

the first and second control parameters comprise adjustment settings to first and second flow control valves of the first and second wellheads, respectively.

7. The system of claim 5, wherein the supplemental information comprises historical data.

8. The system of claim 5, wherein the supplemental information is used by the first and second wellheads to help optimize the extraction of LFG from each of the first and second wellheads.

9. A method for controlling an extraction of landfill gas flow (LFG) from a plurality of wellheads at a landfill, the method comprising:

using a first wellhead located at the landfill and having a first processor and a first communications module;

using a second wellhead located at the landfill in a vicinity of the first wellhead and having a second processor and a second communications module;

using the second communications module to share second operating information pertaining to an extraction of LFG gas from the second wellhead with the processor of the first wellhead;

using the first communications module to share first operating information concerning an extraction of LFG from the first wellhead with the processor of the second wellhead; and using each of the processors of the first and second wellheads to control an extraction of LFG from each, each said processor using both of the first and second operating information, in a manner that optimizes an extraction of LFG from both of the first and second wellheads; and using each of the first and second processors to propose a new LFG setpoint to the other before changing an existing LFG setpoint, and to wait for an approval from the other, and if approval is denied by the other, then to determine a new, modified LFG setpoint and to re-request approval for use of the new, modified LFG setpoint, and then only to implement use if the new, modified LFG setpoint is approved by the other.

* * * * *